(12) United States Patent
Kikuchi

(10) Patent No.: US 7,149,127 B2
(45) Date of Patent: Dec. 12, 2006

(54) FLASH MEMORY CARD

(75) Inventor: Takashi Kikuchi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 10/950,255

(22) Filed: Sep. 27, 2004

(65) Prior Publication Data

US 2005/0073896 A1    Apr. 7, 2005

(30) Foreign Application Priority Data

Oct. 1, 2003    (KR) .................. 10-2003-0068409

(51) Int. Cl.
*G11C 11/34* (2006.01)

(52) U.S. Cl. .................. 365/185.33; 365/185.11

(58) Field of Classification Search .......... 365/185.11, 365/185.33, 185.05, 185.08
See application file for complete search history.

(56) References Cited

U.S. PATENT DOCUMENTS 5,550,489 A * 8/1996 Raab ..................... 326/93
6,456,562 B1 * 9/2002 Abedifard ............... 365/233
6,944,089 B1 * 9/2005 Jeong et al. ............ 365/233
2004/0128425 A1 * 7/2004 Zitlaw et al. ............ 711/1
2005/0253631 A1 * 11/2005 Kim et al. ............... 327/144

FOREIGN PATENT DOCUMENTS

JP    2000-123570    4/2000

* cited by examiner

*Primary Examiner*—Richard Elms
*Assistant Examiner*—Hien Nguyen
(74) *Attorney, Agent, or Firm*—F.Chau & Associates, LLC

(57) ABSTRACT

A flash memory card comprises a flash memory and a controller. The flash memory stores data. The controller detects frequency variation of an external clock signal inputted from a host to generate an internal clock signal. The controller controls the flash memory in response to the internal clock signal. The controller includes a clock-frequency control unit and a clock generator. The clock-frequency control unit detects frequency variation of the external clock signal to generate a detection signal. The clock generator receives the detection signal to generate the internal clock signal. A frequency of the internal clock signal varies corresponding to the frequency variation of the external clock signal.

8 Claims, 3 Drawing Sheets

FLASH MEMORY CARD

CROSS-REFERENCE TO RELATED APPLICATION

This application claims priority to Korean Patent Application No. P2003-68409, filed on Oct. 1, 2003, in the Korean Intellectual Property Office, the disclosure of which is incorporated herein in its entirety by reference.

TECHNICAL FIELD

The present invention relates to a semiconductor memory device, and more particularly, to a memory card comprising flash memory.

BACKGROUND

A memory card is an extension card that can be inserted into a host device such as a computer, a digital camera, or an MP3 player to extend a memory capacity of the host device. The memory card characteristically provides high speed access and large memory capacity. Recently, memory cards having tens of Mega-Bytes memory capacity have been developed. There are various types of memory cards that are currently available, including a Random Access Memory (RAM) card, a Read Only Memory (ROM) card, an Electrically Erasable Programmable Read Only Memory (EEPROM) card, and a flash memory card.

The flash memory card, which is a type of nonvolatile memory, is similar to an EEPROM in that memorized data can be erased through electrical processing. In comparison with the EEPROM where data can be erased by one byte at one time, the flash memory can erase data by a block unit. Thus, the flash memory can be used, for example, as an alternative of, or a supplement for, a hard disc drive in a portable computer.

The flash memory card, having a flash memory therein, has been widely used to store and reproduce data in devices such as MP3 players or digital cameras. Flash memory cards are also used in a digital peripheral apparatus such as flash drives. FIG. 1 is a block diagram showing a structure of a conventional flash memory card. Referring to FIG. 1, the conventional flash memory card 10 includes, for example, a flash memory 11 for storing data, and a controller 12 for controlling data access operations of writing, reading, and erasing data to/from the flash memory 11.

In the conventional flash memory card 10, a frequency of an internal clock signal remains constant irrespective of a frequency of an external clock signal of a host 20. Therefore with this conventional framework, the flash memory card cannot be controlled depending on the frequency of the external clock signal. As a result, maximal efficiency cannot be achieved. For example, the flash memory card cannot be controlled depending on a high clock signal frequency or a low clock signal frequency.

SUMMARY OF THE INVENTION

In one exemplary embodiment of the present invention, a flash memory card comprises a flash memory and a controller. The flash memory stores data. The controller detects frequency variation of an external clock signal inputted from a host to generate an internal clock signal. The controller controls the flash memory in response to the internal clock signal.

In another exemplary embodiment of the present invention, a flash memory card comprises a flash memory, a clock-frequency control unit, a clock generator, and a controller. The flash memory stores data. The clock-frequency control unit detects frequency variation of an external clock signal, which is inputted from a host, to output a detection signal. The clock generator receives the detection signal to generate an internal clock signal. The controller controls the flash memory in response to the internal clock signal.

In another exemplary embodiment of the present invention, a method of operating a computer system with a host and a flash memory card is provided. The method comprises the steps of: receiving an external clock signal from the host; detecting frequency variation of an external clock signal; generating an internal clock signal in response to the frequency variation of the external clock signal; and notifying the host that the internal clock signal is generated.

In yet another exemplary embodiment of the present invention, a method of operating a computer system with a host and a flash memory card is provided. The method comprising the steps of: receiving an external clock signal from the host; determining frequency variation of the external clock signal in the flash memory card; generating an internal clock signal having a frequency, which corresponds to the frequency variation of the external clock signal in the flash memory card; and notifying the host that the internal clock signal has frequency variation in the flash memory card.

These and other exemplary embodiments, aspects, features, and advantages of the invention will become more apparent by describing in detail exemplary embodiments thereof with reference to the attached drawings.

DETAILED DESCRIPTION OF EXEMPLARY EMBODIMENTS

Exemplary embodiments of the present invention now will be described more fully hereinafter with reference to the accompanying drawings. Embodiments of the invention may, however, be embodied in many different forms and should not be construed as limited to the exemplary embodiments set forth herein; rather, exemplary embodiments are provided so that this disclosure will be thorough and complete, and will fully convey the scope of the invention to those skilled in the art.

Figure 1:
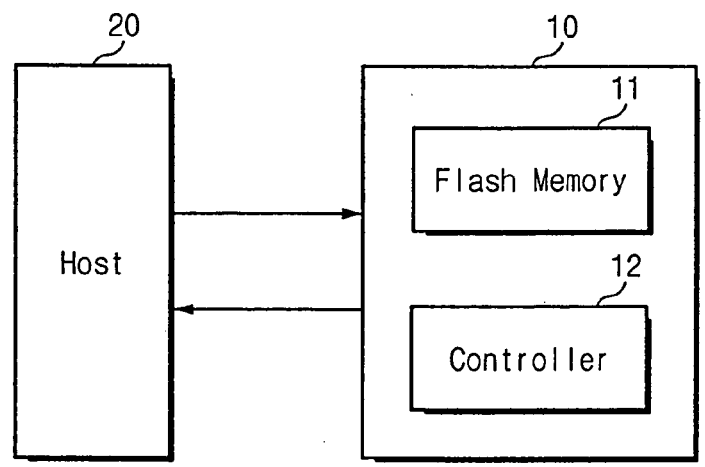
FIG. 1 is a block diagram showing a structure of a conventional flash memory card.
Figure 2:
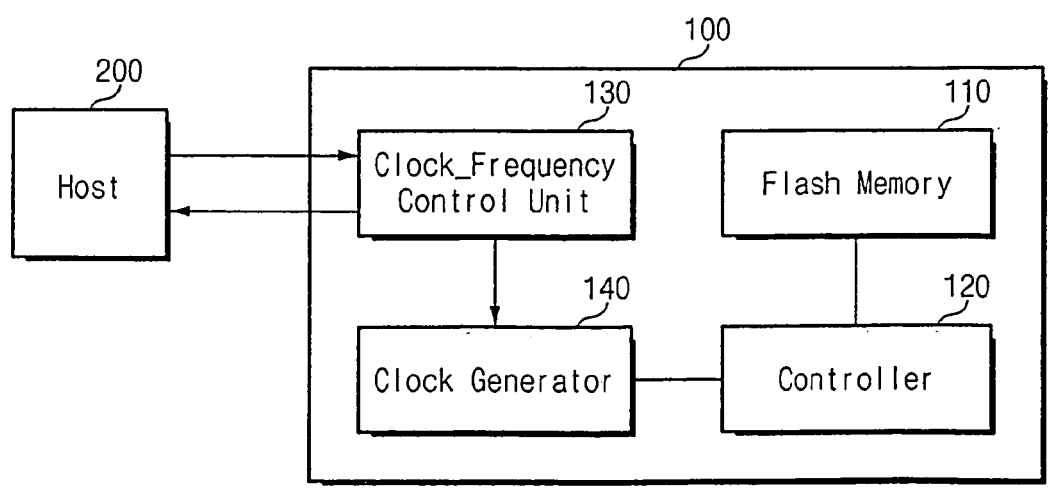
FIG. 2 is a block diagram showing a structure of a flash memory card according to an exemplary embodiment of the present invention.

FIG. 2 is a block diagram showing a structure of a flash memory card according to an exemplary embodiment of the present invention. The flash memory card 100 includes a flash memory 110, a controller 120, a clock-frequency control unit 130, and a clock generator 140. The flash memory 110 stores data. The controller 120 controls data access operations of writing, reading, and erasing data to/from the flash memory 110. The clock-frequency control unit 130 detects the frequency variation of the external clock signal inputted from the host 200. Then, the clock-frequency control unit 130 outputs a detection signal to the clock generator 140. The clock generator 140 generates an internal clock signal, which corresponds to the varied frequency of the external clock signal. The varied frequency of the external clock signal can be received by the clock generator 140 through the detection signal outputted from clock-frequency control unit 130

Figure 3:
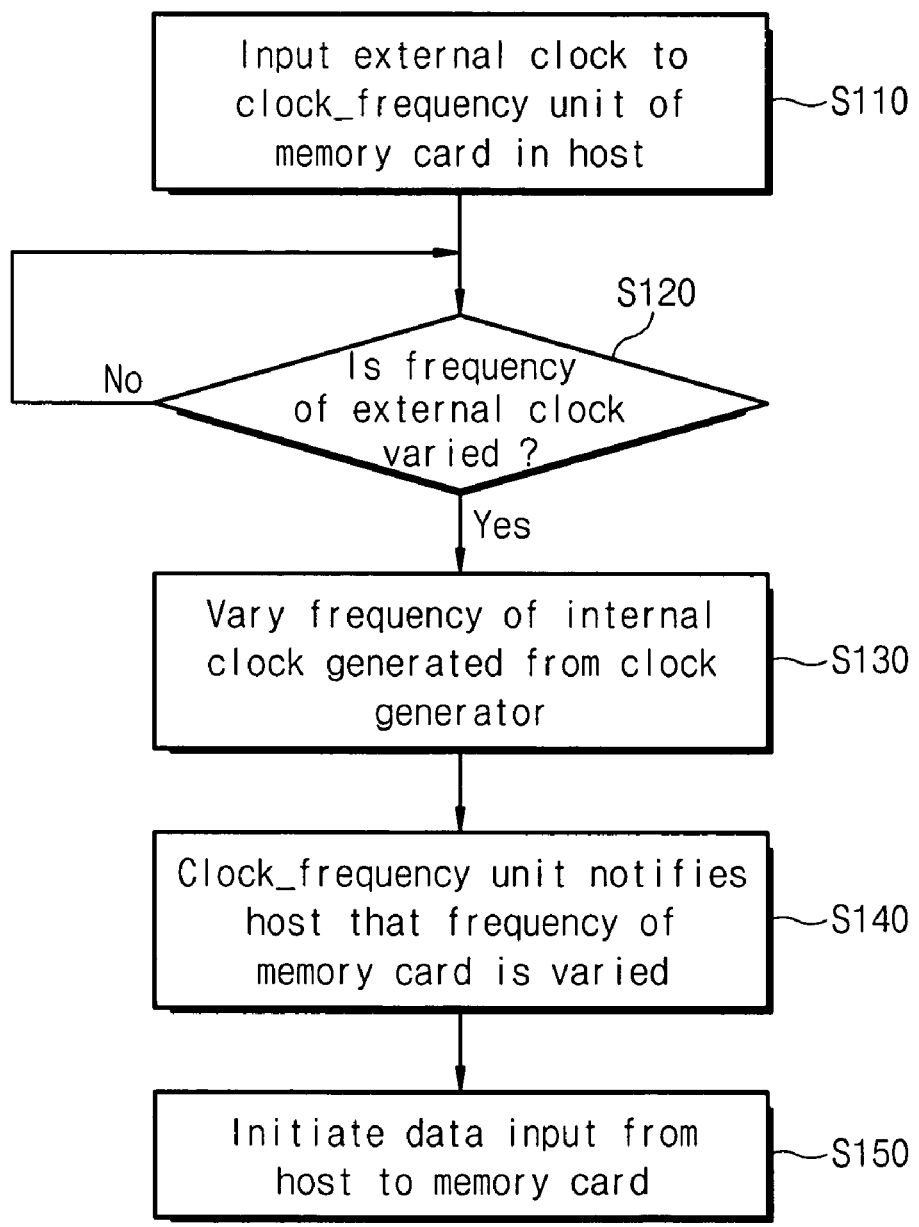
FIG. 3 is a flowchart illustrating an operation of a flash memory card according to an exemplary embodiment of the present invention.

An operation of the above flash memory card according to an exemplary embodiment of the present invention is described with reference to FIG. 3.

First, the host 200 outputs the external clock signal to the flash memory card 100 to access to the flash memory card 100. The clock-frequency control unit 130 of the flash memory card 100 receives the external clock from the host 200 (S110).

The clock-frequency control unit 130 determines whether or not the frequency of the received external clock signal is varied (S120). When the frequency of the received external clock signal is varied, the clock-frequency control unit 130 outputs a detection signal to the clock generator 140. The clock generator 140 generates the internal clock signal with the varied frequency according to the detection signal (S130). As a result, the frequency of the internal clock signal varies corresponding to the frequency of the external clock signal.

Next, the clock-frequency control unit 130 notifies the host 200 that the frequency of the internal clock signal of the flash memory card 100 is varied (S140). Then, the host 200 initiates data input to the flash memory card 100 (S150).

Figure 4:
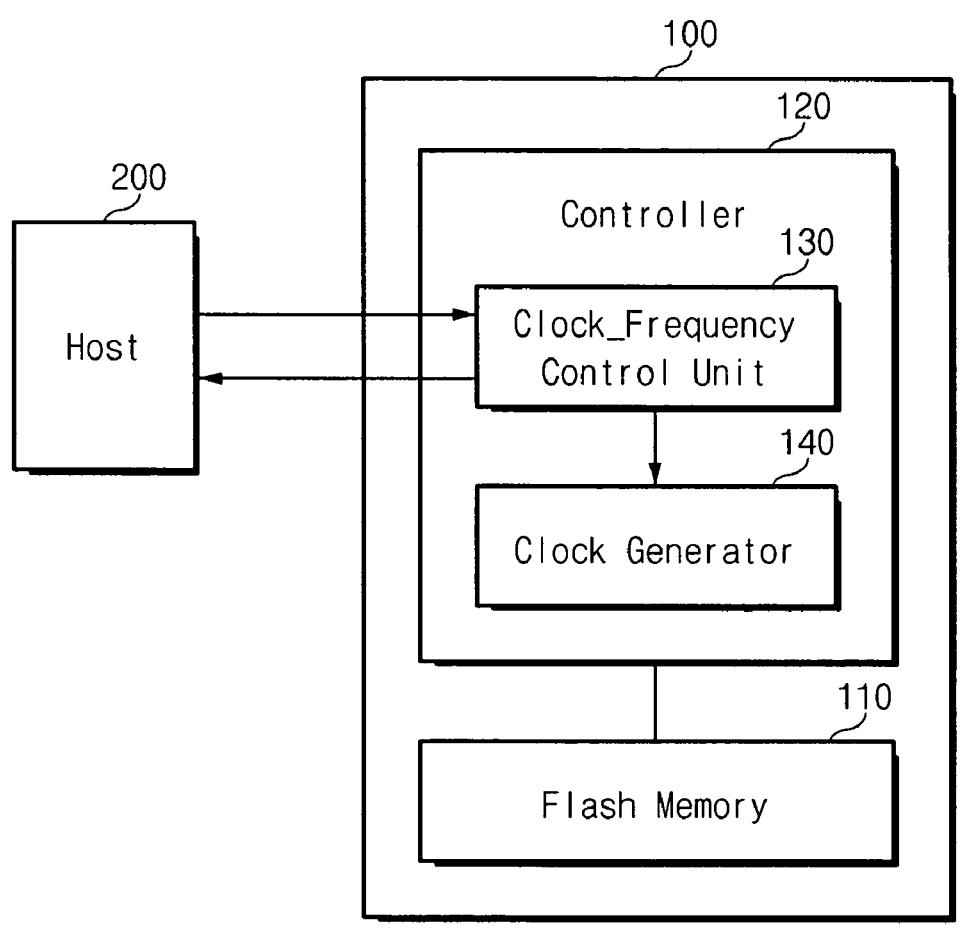
FIG. 4 is a block diagram showing a structure of a flash memory card according to another exemplary embodiment of the present invention.

FIG. 4 is a block diagram showing the structure of a flash memory card according to another exemplary embodiment of the present invention. In the exemplary embodiment of FIG. 4, a controller 120 of a flash memory card 100 is included with functions of a clock-frequency control unit 130 and a clock generator 140.

Since the frequency of the internal clock signal of the flash memory card can be controlled by the clock signal frequency of the host, power efficiency and performance of the flash memory card can be improved.

Although exemplary embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A flash memory card comprising:
   a flash memory for storing data; and
   a controller for detecting frequency variation of an external clock signal inputted from a host to generate an internal clock signal, and controlling the flash memory to store data in the flash memory in response to the internal clock signal.

2. The flash memory card of claim 1, wherein the controller includes:
   a clock-frequency control unit for detecting frequency variation of the external clock signal to generate a detection signal; and
   a clock generator for receiving the detection signal to generate the internal clock signal.

3. The flash memory card of claim 2, wherein a frequency of the internal clock signal varies corresponding to the frequency variation of the external clock signal.

4. A flash memory card comprising:
   a flash memory for storing data;
   a clock-frequency control unit for detecting frequency variation of an external clock signal, which is inputted from a host, to output a detection signal;
   a clock generator for receiving the detection signal to generate an internal clock signal; and
   a controller for controlling the flash memory to store the data in the flash memory in response to the internal clock signal.

5. The flash memory card of claim 4, wherein a frequency of the internal clock signal varies corresponding to the frequency variation of the external clock.

6. A method of operating a computer system with a host and a flash memory card, the method comprising the steps of:
   receiving an external clock signal from the host;
   detecting frequency variation of an external clock signal;
   generating an internal clock signal in response to the frequency variation of the external clock signal; and
   notifying the host that the internal clock signal is generated.

7. The method in claim 6, wherein a frequency of the internal clock signal varies corresponding to the frequency variation of the external clock.

8. A method of operating a computer system with a host and a flash memory card, the method comprising the steps of:
   receiving an external clock signal from the host;
   determining frequency variation of the external clock signal in the flash memory card;
   generating an internal clock signal having a frequency, which corresponds to the frequency variation of the external clock signal in the flash memory card; and
   notifying the host that the internal clock signal has frequency variation in the flash memory card.

* * * * *